Feb. 14, 1928.

E. D. TILLYER 1,659,176

PICTURE PROJECTION FILM

Filed May 12, 1923

INVENTOR
E. D. TILLYER
BY
Harry H. Styll
ATTORNEY

Patented Feb. 14, 1928.

1,659,176

UNITED STATES PATENT OFFICE.

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

PICTURE-PROJECTION FILM.

Application filed May 12, 1923. Serial No. 638,446.

This invention relates to improvements in photographic projection positives and a method of projecting positives, and has particular reference to films used in stationary picture projection and continuous film motion picture work.

It is well known that one of the chief sources of annoyance and danger in picture projection work lies in the overheating of the film, which is easily damaged. Particularly in motion picture work the powerful illumination required for projections contains so much radiant energy that if the motion of the film is halted, the film will ignite almost instantly, ruining the film, delaying the exhibition, and in many cases endangering the life of the machine operator. It is often desirable to show a "still picture" or some certain view of the continuous film, but with the ordinary projection motion picture machines it cannot be done, and there is no satisfactory machine for the still projection of films like a stereopticon, except with the use of cumbersome heat filters, which can only be partially efficient.

Much scientific thought and experimentation has been applied towards overcoming these objectionable features of projections with films, partly directed toward the fireproofing of the film and partly directed toward the provision of a filter interposed between the light and the film, whereby the heat rays will be absorbed and the light rays transmitted. During the course of experimental work on this subject I have discovered that the principal cause of film ignition is due to the fact that the surface of the film is composed of a series of black, gray, and transparent areas, the transparent areas transmitting the light and heat rays, while the black and gray areas, being opaque or partially opaque, absorb the light and heat rays and the thermal energy contained therein. By preventing the absorption of the light and thermal energy by the opaque areas of the film, the possibilities of burning or other damage by overheating is reduced to a minimum, and I prevent such absorption by my invention, wherein the film is so made that the radiant energy will not be absorbed but will be reflected back by the opaque areas, or diffused thereby.

One object of the present invention is to provide a projection film whereby the light rays and thermal energy will not be absorbed by the film.

Another object is to provide a projection film which will not be subject to damage by the radiant energy of the illuminating means of the projection machine.

Another object is to provide such a film whereby the light and heat rays will not be absorbed by those portions of the film which produce the black portions of the picture.

Other objects and advantages will be apparent from the following description taken in connection with the accompanying drawings, wherein similar reference characters designate corresponding parts throughout the several views.

Figure 1:
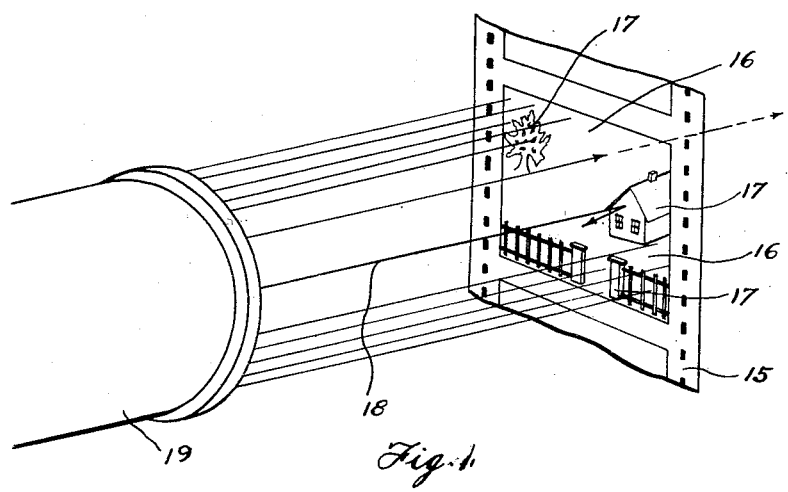
Figure 1 is a diagrammatic view of my improved film.

As shown in Figure 1, my improved film 15 has a picture composed of the usual transparent areas 16 and the opaque areas 17, said picture being disposed in the path of light rays 18 from the usual source of illumination 19. Instead of forming the opaque areas of my film of a black silver deposit, I make the surfaces of the opaque areas non-absorbing and dispersive, on the illuminated side, whereby the light rays and accompanying thermal energy striking the opaque areas will not be absorbed but will be thrown away from the film.

There are a number of ways that this photographic result may be accomplished, one method being to develop the film with special colloidal silver developing agents, preferably in acid solutions, such that the silver is deposited as metallic mirror in form.

Figure 2:
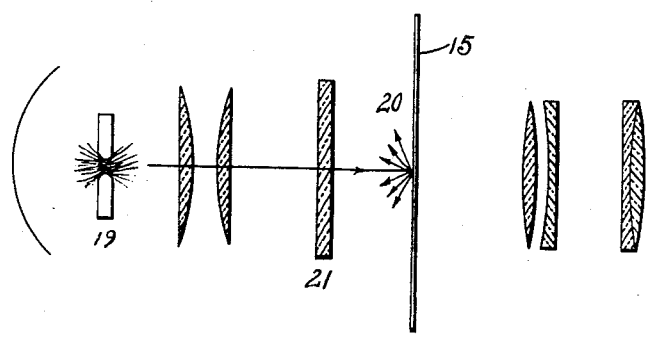
Figure 2 is a diagrammatic view of another modification wherein I use a light filter and a diffusing positive.

Instead of reflecting the light from the opaque areas, I may diffuse it with equally good results, as shown at 20 in Figure 2. To do this, I bleach the developed film and by means of chemical substitution produce an inert whitish opaque deposit such as bichloride of mercury solution in place of the black silver grain originally present. By white I mean a substance that it not an absorber of radiant energy, but a diffuser, so that the light and heat, instead of geometrically continuing toward the projection lens, is diffused in all directions by the opaque areas. Only a very small amount of this diffused light passes the projection lens, and consequently the opaque areas of the picture are projected black, while if directly viewed they appear bright.

If desirable, I may interpose a light filter 21 between the film 15 and the source of illumination 19, as shown in Figure 2, whereby the visible rays will be transmitted and the invisible rays absorbed or reflected. A filter such as disclosed in my Patent No. 1,434,268, issued October 31, 1922, will suffice for this purpose, or others of a similar character may be used. Thus a certain amount of the thermal energy from the light will be absorbed before reaching the film, and the remaining energy either reflected or diffused thereby, so that the film cannot become overheated and damaged.

Figure 3:
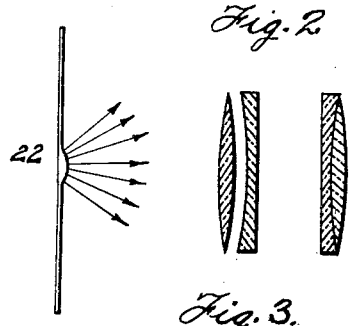
Figure 3 is a diagrammatic view of still another form of the invention.

In place of forming the film with transparent and opaque areas, the opaque areas being inert white for the diffusion of the light whereby dark images will be projected on the screen, I may form such diffusing areas by transparent refracting areas like little lenses as shown at 22 in Figure 3, this construction also being possible either with or without a light filter.

From the foregoing description it will be readily apparent that I have devised a new and novel method of picture projection from films, whereby the radiant energy of the illuminating means will not be absorbed by the film and concentrated in a small area, but will be thrown away from it. Thus the overheating of the film and consequent damage thereto will be avoided, rendering picture projection exhibitions more satisfactory and less dangerous to the machine operator.

While films have been spoken of throughout as being more subject to damage, the regular lantern slide or other plates may be protected from damage by the same system, and are included in my definition of the word film. By transparent areas is meant those areas which permit the passage of the radiant energy sensibly unchanged in direction and amount.

Obviously changes may be resorted to, and I herein reserve the right to make such changes falling within the scope of the appended claims without departing from the spirit of my invention.

What I claim is:

1. A projection film having a picture formed of opaque areas on a transparent field, said opaque areas being formed of reflecting metallic deposits on the illuminated side of the film.

2. A projection film having a picture formed of opaque areas on a transparent field by deposits of silver in the form of a metallic mirror.

3. A projection member having a picture formed of opaque areas on a transparent field by deposits of metal in the form of a mirror.

4. A projection member having a picture formed of opaque areas on a transparent field by deposits of a whitish salt.

5. A projection member having a picture formed of opaque areas on a transparent field by deposits of a whitish light reflective salt.

EDGAR D. TILLYER.